United States Patent Office 3,450,793
Patented June 17, 1969

3,450,793
MODIFIED POLYCARBONATES CONTAINING URETHANE GROUPS
Hermann Schnell, Krefeld-Urdingen, and Ludwig Bottenbruch, and Dietrich Michael, Krefeld, Bockum, Germany, assignors to Farbenfabriken, Bayer Aktiengesellschaft, Leverkusen, Germany, a corporation of Germany
No Drawing. Filed Nov. 26, 1965, Ser. No. 510,045
Claims priority, application Germany, Nov. 27, 1964, F 44,555
Int. Cl. C08g 41/04
U.S. Cl. 260—858           16 Claims

ABSTRACT OF THE DISCLOSURE

Polycarbonates containing polyurethane segments which are substantially linear prior to incorporation into the polymeric structure, and have alkyl, cycloalkyl or aryl substitution on the nitrogen atoms thereof.

---

The present invention relates to novel thermoplastic resins, and more particularly to modified polycarbonate resins containing urethane groups.

Heretofore it was known that polycarbonates of aromatic dihydroxy compounds could be modified by incorporating carbamide-, urethane-, allophanate-, biuret- and the like nitrogen-containing groups. These groups may be statistically distributed in the chains of the polycarbonate molecules or incorporated in an orderly fashion. In the latter case, where certain improvements in the properties as compared with those of nonmodified polycarbonates are observed, the products have chains of polycarbonate molecules interrupted by, e.g., polyurethane blocks which in turn have been produced by the reaction of organic dihydroxy compounds with organic diisocyanates and thus carry a hydrogen atom on each nitrogen atom.

In the preparation of the aforesaid modified polycarbonates, the polyurethane blocks were either linked to preformed polycarbonate blocks or the polycarbonate chains were built up in situ by starting from the ends of the polyurethane blocks. Where the polyurethane blocks have isocyanate end groups they can be reacted directly with polycarbonate blocks having hydroxy end groups or if desired with dihydroxy compounds which are then reacted with further molecules of their own kind to form polycarbonate chains by the reaction with phosgene or dichlorocarbonic acid esters in the presence of substances which bind hydrogen chloride or by ester interchange with diesters of carbonic acid, preferably in the presence of ester interchange catalysts. However, if the polyurethane blocks contain hydroxyl end groups then they can be incorporated into polycarbonate chains, either again by linkage to preformed polycarbonate blocks or by the building up of polycarbonate chains in situ, either by the phosgenation or dichlorocarbonic acid ester process or by the ester interchange process.

However, it was found that polycarbonates having reactive hydrogen atoms linked to the nitrogen atoms were not thermally stable and decomposed when heated above their melting point.

Therefore, it is an object of this invention to provide polycarbonate resins which are thermally stable. It is another object of this invention to provide polycarbonate resins which contain urethane groups. It is still another object of this invention to provide polycarbonate resins containing urethane groups which are free of a reactive hydrogen to nitrogen linkage. It is a further object of this invention to provide modified polycarbonate resins which are insensitive to corrosion following stress cracking. It is still a further object of this invention to provide a method for the preparation of polycarbonates which are modified by polyurethane groups arranged in blocks.

Generally speaking, the foregoing objects as well as others are accomplished in accordance with this invention by providing a method for preparing linear polyurethanes by reacting disecondary diamines with bis-halocarbonic acid esters of organic dihydroxy compounds, preferably of diphenols and then incorporating these polyurethane blocks into high molecular weight polycarbonates. In other words, the nitrogen atom of these linear polyurethane blocks are substituted with alkyl, cycloalkyl and/or aryl radicals in lieu of the conventional reactive hydrogen atom.

Structurally, the novel polyurethane blocks of this invention are composed of the recurring structural units having the formula:

(I) 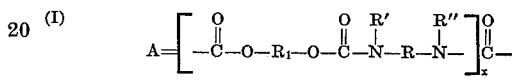

The novel polyurethane blocks which are illustrated above are incorporated into high molecular weight polycarbonates having the formula:

(II) 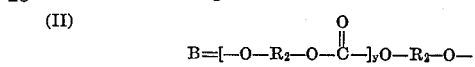

wherein R is an organic group such as an alkylene radical having from 3 to 10 carbon atoms such as propylene, butylene, amylene, hexylene, octylene, decylene, and arylene radicals such as phenylene, diphenylene, naphthylene and the like; R' and R'' which may be the same or different are alkyl, cycloalkyl or aryl radicals having from 1 to 12 carbon atoms such as, methyl, ethyl, propyl, butyl, pentyl, hexyl, octyl, undecyl, phenylethyl, phenylpropyl, phenylbutyl, o, m, and p-tolyl, o, m, and p-cumenyl phenyl, diphenyl and the like; $R_1$ and $R_2$ which may be the same or different are divalent aliphatic, cycloaliphatic and aromatic groups. The cycloaliphatic and aromatic groups may be represented by the formula (III) 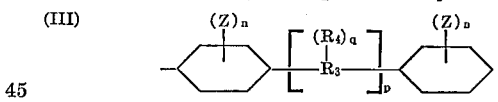

wherein $R_3$ is selected from the group consisting of alkylene and an alkylidene residue, $R_4$ is a monovalent hydrocarbon residue; Z is a chemical constituent selected from the group consisting of (a) inorganic atoms such as the halogen atoms, (b) alkyl radicals having from 1 to 4 carbon atoms; $n$ is a whole number equal to from 0 to a maximum determined by the number of replaceable nuclear hydrogens substituted on the aromatic hydrocarbon residue; $q$ is a whole number equal to from 0 to a maximum determined by the number of replaceable hydrogens on $R_3$; $p$ is a whole number equal to from 0 to 1 inclusive; $x$ and $y$ are variable integers each having a value of at least 1, and $x$ is equal to a molecular weight of at least 1,500. The molecular weight of the modified polycarbonate polymer containing urethane groups will of course vary depending on the values of $x$ and $y$. Preferably the average molecular weight will be at least 3,000.

The modified polycarbonate polymer according to the invention may be represented by the formula:

(IV) 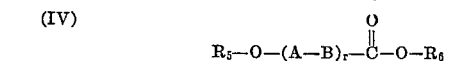

wherein $R_5$ and $R_6$ may be the same or different and are monovalent aryl radicals such as phenyl and naphthyl which may be substituted by inorganic atoms such as halogen atoms or by alkyl radicals having from 1 to 12 carbon atoms such as methyl, ethyl, propyl, isopropyl, butyl, isobutyl, amyl, nonyl and dodecyl, or by phenyl, and $r$ is a whole number and equal to a molecular weight of preferably at least about 3,000, especially from about 10,000 to about 150,000.

The polyurethane blocks may be incorporated into the high molecular weight polycarbonates in a manner analogous to that described heretofore for incorporating polyurethane blocks formed by the reaction of organic dihydroxy compounds with organic diisocyanates, the only difference being that the end groups of the polyurethane blocks formed by the reaction of disecondary diamines with bis-halocarbonic acid esters consist neither of isocyanate groups nor of hydroxyl groups, but as a rule of chlorocarbonic acid ester end groups. This makes it readily possible to incorporate the polyurethane blocks into the chains of polycarbonate molecules by the phosgenation or the dihalocarbonic acid ester process.

If desired, these polyurethane blocks having halocarbonic acid ester end groups may first be reacted with equivalent quantities of a monohydroxy compound, e.g., a phenol, and the halocarbonic acid ester end groups may thus be converted into carbonic acid ester end groups. The polyurethane blocks can then readily be incorporated by the ester interchange process.

The polyurethane blocks, therefore, correspond to the Formula V:

(V)
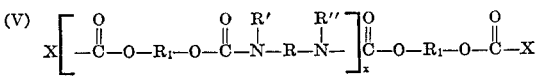

X being Cl, Br or

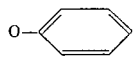

The molecular weight of the polyurethane blocks which are incorporated into the polycarbonate chains is suitably between about 1,500 and about 30,000 preferably between about 2,000 and about 10,000.

The desired modification in the properties of the polycarbonates is generally achieved by incorporating polyurethane blocks in quantities of about 0.01 to about 10 mol percent. This means that the ratio of $A:B$ in Formula IV and correspondingly the ratio of $x:y$ of the Formulae I and II may vary within 1:10,000 and 1:9.

The diamines used to prepare these polymers may be any secondary aliphatic, alicyclic, heterocyclic or aromatic diamine. Representative examples of suitable disecondary diamines for the preparation of the polyurethane blocks are N,N'-dimethyl-, diethyl-, dipropyl-, diisopropyl-, dibutyl-, diisobutyl-, dicyclohexyl- and diphenyl - tetramethylenediamine, -pentamethylenediamine, -hexamethylenediamine and -1,4-diaminocyclohexane, N,N'-dimethyl-, diethyl- etc., m- and p-phenylenediamine, N,N'-dimethyl-, diethyl- etc., aminodiphenylalkanes, e.g., -propane, and -cycloalkanes, e.g., -cyclohexane, piperazine and the like. Mixtures of these secondary diamines may be used. Derivatives of these diamines may also be used as long as the substituents do not interfere with the polymerization. For example, they may have hydrocarbon side chains or be substituted with halogen or nitro groups which are inert under the conditions used therein.

Such disecondary diamines are reacted with dihalocarbonic acid esters of organic, preferably aromatic dihydroxy compounds in such an excess, in the presence of agents which bind hydrogen halide, that polyurethanes having halocarbonic acid end groups are formed. Particularly useful copolymers are formed when the disecondary diamines are combined with dichlorocarbonic acid esters of organic dihydroxy compounds.

The polyurethanes may be prepared by two methods. They are:
(1) Interfacial polymerization, and
(2) Solution polymerization.

Interfacial polymerization has rapidly attained increased importance in the polymer field. It is a rapid moderate temperature reaction in which the reactants are brought together in such a way that the reaction zone is at, or is immediately adjacent to, a liquid-liquid interface. Thus most of the molecules of at least one of the reactants must diffuse through liquid diluent to arrive at the reaction zone. For preparing the polymers of this invention the reactants in one liquid phase may be one or more of the disecondary diamines and the reactants in the other liquid phase may be one or more of the dihalocarbonic acid esters of the organic dihydroxy compounds. Other combinations are possible, as has been indicated earlier. The two liquid phases are mixed to form a two phase system in which the disecondary diamine and the dihalocarbonic acid esters of the organic dihydroxy compounds are in separate phases, at least one which includes a liquid diluent. Preferably, a reactant is a liquid under the reaction conditions, or is dissolved in a diluent, but one of the reactants may be dispersed or suspended as a finely divided solid in a diluent which will dissolve it, at least partially. The phases are mixed in the presence of a hydrogen halide binding agent until the desired condensation polymerization has taken place and then, if desired, the polymers obtained are isolated.

Low molecular weight polymers have been prepared for some time by forming a homogeneous solution of reactants and allowing the reaction to continue at moderate temperatures or heating to produce the polymers. The solution polymerization method used here for preparing polyurethane polymers involves, for example, dissolving the disecondary diamines and dihalocarbonic acid esters of organic dihydroxy compounds in separate portions of the same solvent and then mixing and adding the hydrogen halide binding agent to form high molecular weight polymers. The molecular weight of the polymers is controlled by the choice of solvent medium or by the use of mixtures of appropriate solvents. The solvent is one which is inert to the reactants and is usually selected to produce a high molecular weight polymer.

The polycarbonate blocks which may be linked according to the invention with the polyurethane blocks having chlorocarbonic acid end groups or, as mentioned above, with carbonic acid ester end groups may be prepared by known processes, i.e., by reacting the corresponding dihydroxy compounds with derivatives of carbonic acid, such as phosgene, bis-halocarbonic acid esters or by ester interchange of these with diesters of carbonic acid under splitting off HX, X being Cl, Br or

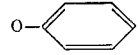

These high molecular weight polycarbonate blocks may be produced from a great number of dihydroxy compounds, that is of aliphatic, cycloaliphatic and aromatic dihydroxy compounds. For example, there may be mentioned:

As aromatic dihydroxy compounds: hydroquinone, resorcinol, pyrocatechol, 4,4'-dihydroxydiphenyl, 2,2'-dihydroxydiphenyl, 1,4-dihydroxynaphthalene, 1,6-dihydroxynaphthalene, 2,6-dihydroxynaphthalene, 1,2-dihydroxynaphthalene, 1,5-dihydroxynaphthalene, dihydroxyanthracene, 2,2'-dihydroxydinaphthyl-1,1' and o, m, p-hydroxybenzyl-alcohol.

Preferred classes of aromatic dihydroxy compounds are the dimonohydroxy arylene sulphones and particularly the dimonohydroxyarylene alkanes, such as 4,4'-dihydroxydiphenylene sulphone,
2,2'-dihydroxydiphenylene sulphone,
3,3'-dihydroxydiphenylene sulphone,
4,4'-dihydroxy-2,2'-dimethyl-diphenylene sulphone,
4,4'-dihydroxy-3,3'-dimethyl-diphenylene sulphone,
2,2'-dihydroxy-4,4'-dimethyl-diphenylene sulphone,
4,4'-dihydroxy-2,2'-diethyldiphenylene sulphone,
4,4'-dihydroxy-3,3'-diethyldiphenylene sulphone,
4,4'-dihydroxy-2,2'-di-tert.-butyl-diphenylene sulphone, 4,4'-dihydroxy-3,3'-di-tert.-butyl-diphenylene sulphone, and
2,2'-dihydroxy-1,1'-dinaphthylene sulphone;
and furthermore, 4,4'-dihydroxy-diphenylene-methane,
1,1-(4,4'-dihydroxy-diphenylene)-ethane,
1,1-(4,4'-dihydroxy-diphenylene)-propane,
1,1-(4,4'-dihydroxy-diphenylene)-butane,
1,1-(4,4'-dihydroxy-diphenylene)-2-methyl-propane,
1,1-(4,4'-dihydroxy-diphenylene)-heptane,
(4,4'-dihydroxy-diphenylene)-phenyl-methane,
(4,4'-dihydroxy-diphenylene)-(4-methyl-phenylene)-methane,
(4,4'-dihydroxy-diphenylene)-(4-ethyl-phenylene)-methane,
(4,4'-dihydroxy-diphenylene)-(4-isopropyl-phenylene)-methane,
(4,4'-dihydroxy-diphenylene)-(4-butyl-phenylene)-methane,
(4,4'-dihydroxy-diphenylene)-benzyl-methane,
(4,4'-dihydroxy-diphenylene)-alpha-furyl-methane,
2,2-(4,4'-dihydroxy-diphenylene)-propane,
2,2-(4,4'-dihydroxy-diphenylene)-butane,
2,2-(4,4'-dihydroxy-diphenylene)-pentane,
2,2-(4,4'-dihydroxy-diphenylene)-4-methyl-pentane,
2,2-(4,4'-dihydroxy-diphenylene)-heptane,
2,2-(4,4'-dihydroxy-diphenylene)-octane,
2,2-(4,4'-dihydroxy-diphenylene)-nonane,
1,1-(4,4'-dihydroxy-diphenylene)-1-phenyl-ethane,
(4,4'-dihydroxy-diphenylene)-1-(alpha-furyl)-ethane,
3,3-(4,4'-dihydroxy-diphenylene)-pentane,
4,4-(4,4'-dihydroxy-diphenylene)-heptane,
1,1-(4,4'-dihydroxy-diphenylene)-cyclopentane,
1,1-(4,4'-dihydroxy-diphenylene)-cyclohexane,
2,2-(4,4'-dihydroxy-diphenylene)-decahydronaphthalene,
2,2-(4,4'-dihydroxy-3,3'-dicyclohexyl-diphenylene)-propane,
2,2-(4,4'-dihydroxy-3-methyl-diphenylene)-propane,
2,2-(4,4'-dihydroxy-3-isopropyl-diphenylene)-butane,
1,1-(4,4'-dihydroxy-3,3'-dimethyl-diphenylene)-cyclohexane,
2,2-(4,4'-dihydroxy-3,3'-dibutyl-diphenylene)-propane,
2,2-(4,4'-dihydroxy-3,3'-diphenyl-diphenylene)-propane,
2,2-(4,4'-dihydroxy-2,2'-dimethyl-diphenylene)-propane,
1,1-(4,4'-dihydroxy-3,3'-dimethyl-6,6'-dibutyl-diphenylene)-butane,
1,1-(4,4'-dihydroxy-3,3'-dimethyl-6,6'-ditert.butyl-diphenylene)-ethane,
1,1-(4,4'-dihydroxy-3,3'-dimethyl-6,6'-ditert.butyl-diphenylene)-propane,
1,1-(4,4'-dihydroxy-3,3'-dimethyl-6,6'-ditert.butyl-diphenylene)-butane,
1,1-(4,4'-dihydroxy-3,3'-dimethyl-6,6'-ditert.butyl-diphenylene)-isobutane,
1,1-(4,4'-dihydroxy-3,3'-dimethyl-6,6'-ditert.butyl-diphenylene)-heptane,
(4,4'-dihydroxy-3,3'-dimethyl-6,6'-ditert.butyl-diphenylene)-phenyl-methane,
1,1-(4,4'-dihydroxy-3,3'-dimethyl-6,6'-ditert.butyl-diphenylene)-2-methyl-2-pentane,
1,1-(4,4'-dihydroxy-3,3'-dimethyl-6,6'-ditert.butyl-diphenylene)-2-ethyl-2-hexane, and
1,1-(4,4'-dihydroxy-3,3'-dimethyl-6,6'-ditert.amyl-diphenylene)-butane, and bis-hydroxyphenyl ethers, sulphides and sulphoxides.

The polycarbonates may also be modified further in known manner by the incorporation of aliphatic and/or cycloaliphatic dihydroxy compounds. Examples of such dihydroxy compounds are ethylene glycol, diethylene glycol, triethylene glycol, polyethylene glycol, thiodiglycol, ethylene dithiodiglycol, the di- and polyglycols produced from propylene oxide-1,2, o, m or p-xylylene glycol, propanediol-1,3, butanediol-1,3, butanediol-1,4, 2-methyl-propanediol-1,3, pentanediol-1,5, 2-ethyl-propanediol-1,3, hexanediol-1,6, octanediol-1,8, 1-ethylhexanediol-1,3 and decanediol-1,10.

Examples of cycloaliphatic dihydroxy compounds are cyclohexanediol-1,4, cyclohexanediol-1,2, 2,2-(4,4'-dihydroxy-dicyclohexylene)-propane and 2,6-dihydroxydecahydronaphthalene and bis-alkoxylated aromatic dihydroxy compounds of the above.

The formation of the polycarbonate blocks by reacting the aforesaid di-(monohydroxy-aryl)-alkanes into high molecular polycarbonates by reacting with the mentioned derivatives of the carbonic acid may be carried out as known in the art. For instance, the di-(monohydroxy-aryl)-alkanes can be re-esterified with carbonic acid diesters, e.g., dimethyl-, diethyl-, dipropyl-, dibutyl-, diamyl-, dioctyl-, dicyclohexyl-, diphenyl- and di-o, p-tolyl carbonate, at elevated temperatures from about 50 to about 320° C. and especially from about 120 to about 280° C., preferably under reduced pressure of about 10 to about 0.1 mm. Hg and under the addition of transesterification catalysts such as alkali metals and alkali and alkaline earth metal hydrides, oxides, carbonates, phenolates and so on as known in the art.

The polycarbonates can also be produced by introducing phosgene into solutions of di-(monohydroxyaryl)-alkanes in organic bases, such as dimethylaniline, diethylaniline, trimethylamine and pyridine, or into solutions of di-(monohydroxyaryl)-alkanes in indifferent organic solvents, such as benzine, ligroine, cyclohexane, methylcyclohexane, benzene, toluene, xylene, chloroform, methylene chloride, carbon tetrachloride, trichloroethylene, dichloroethane, methylacetate and ethylacetate, with the addition of an acid-binding agent as mentioned above.

A process particularly suitable for producing polycarbonates consists in introducing phosgene into the aqueous solution or suspension of alkali metal salts such as lithium-, sodium-, potassium- and calcium hydroxide- or carbonate. The polycarbonate precipitates out from the aqueous solution.

The conversion in the aqueous solution is promoted by the addition of indifferent solvents of the kind mentioned above which are capable of dissolving phosgene and eventually the produced polycarbonate.

The phosgene may be used in an equivalent amount. Generally, however, it is preferable to use an excess of the phosgene.

Finally, it is also possible to react the di-(monohydroxyaryl)-alkanes with about equimolecular amounts of bis-halocarbonic acid esters of di-(monohydroxyaryl)-alkanes under corresponding conditions.

In the production of polycarbonates according to the various processes it is advantageous to employ small amounts of reducing agents, for example, sodium- or potassium-sulphide, -sulphite and -diethionite.

The reaction of the di-(monohydroxyaryl)-alkanes with phosgene or the halocarbonic acid esters of the di-(monohydroxyaryl)-alkanes may be carried out at room temperature or at lower or elevated temperatures, that is to say at temperatures from the freezing point to the boiling point of the mixture.

It is essential that the dihydroxy compounds be used in excess when reacted with derivatives of carbonic acid in order to obtain polycarbonate blocks having hydroxyl end groups.

When the polyurethane blocks and the polycarbonate blocks are prepared as described above, the polymethane blocks, in the case that they have halocarbonic acid end groups, and the polycarbonate blocks having hydroxyl end groups are simultaneously dissolved in an inert organic solvent such as methylene chloride, and a hydrogen halide binding agent, for example, a tertiary amine, or an alkali metal or alkaline earth metal hydroxyl or carbonate solution or dispension preferably together with a catalytic amount of a tertiary amine, as described above in connection with the polycarbonate production process, is added. If the polyurethane blocks have carbonic acid phenyl ester end groups they may be melted together with the polycarbonate, as mentioned above, and transesterified in the temperature range from about 150 to about 350° C., preferably under reduced pressure of about 10 to about 0.1 mm. Hg and in the presence of a transesterification catalyst as mentioned above in connection with the polycarbonate production process.

On the other hand, the polyurethane may be reacted with an organic dihydroxy compound, preferably di-(monohydroxyaryl)-alkanes, and phosgene or bishalocarbonic acid ester under splitting off HX wherein X is chlorine or bromine. Suitable di-(hydroxyaryl)-alkanes and other dihydroxy compounds are listed above and the same or a different di-(hydroxyaryl)-alkane may be chosen for the copolymerization step as was used in the polyurethane preparation. By adding monofunctional compounds which are capable of reacting with phosgene or with the end groups of the polycarbonates consisting of the halocarbonic acid ester group and which terminate the chains, such as the phenols, for instance, the phenol, the tert.-butylphenol, the cyclohexylphenol, and 2,2-(4-hydroxyphenyl-4'-methoxyphenyl)-propane, it is possible to regulate the molecular weight of the polycarbonates in wide limits. The products are not polycarbonates per se, but are copolymers which contain both urethane linkages and carbonate linkages in random block distribution.

The copolymerization reaction is preferably effected in the presence of aqueous alkali, e.g., aqueous solutions of alkali metal or alkaline earth metal hydroxides such as sodium hydroxide, potassium hydroxide, lithium hydroxide and calcium hydroxide, the corresponding alkali metal or alkaline earth metal salt of the di-(hydroxyaryl)-alkane being dissolved or suspended in the aqueous alkaline solution.

Furthermore, the reaction is preferably effected in the presence of an inert organic liquid which is water immiscible but is a solvent for the copolymer produced. It is also preferable that the solvent be a solvent for the polyurethane formed in the first stage of the process. Suitable solvents are, for example, methylene chloride, chloroform, carbon tetrachloride, toluene, xylene, trichloroethane, tetrachloroethane and chlorobenzene.

When the addition of phosgene or bis-halocarbonic acid ester to the reaction mixture has ceased, it is advantageous to add a catalytic amount of a tertiary amine, e.g., triethylamine, dimethyl aniline, pyridine and the like, to reduce the time for completion of the reaction and also to reduce the excess of phosgene required.

Typical processes for preparing modified polycarbonate resins containing urethane groups are described in the following examples where parts are by weight unless otherwise specified.

The relative viscosities given in the following examples are measured in 0.5% methylene chloride solutions at 25° C.

EXAMPLE 1

Approximately 141 parts of a dichlorocarbonic acid ester of bisphenol A are dissolved in about 600 ml. of methylene chloride and cooled to 4° C. About 44 parts of triethylamine are then added dropwise over a period of about 30 minutes maintaining the temperature below about 4° during this time. A solution containing about 38.8 parts of piperazine hexahydrate in about 200 ml. of water is then added at about 4° over a period of about 45 minutes. The mixture is then stirred for about one hour at a temperature between about 4 and 10° C. after which time the phases are separated. The organic phase is washed with water and dried over $Na_2SO_4$. The solution is then concentrated on a steam bath and evaporated in a vacuum drying cupboard. The relative viscosity of the polyurethane obtained is about 1.041 which corresponds to a molecular weight of about 3,000.

About 3,000 parts of bisphenol A, about 140 parts of polyurethane, about 26.4 parts of p-tertiary-butyl phenol, about 1.3 parts of $NaBH_4$ as reducing agent, about 34,500 parts of methylene chloride, about 3,460 parts of a 45% sodium hydroxide solution and about 10,000 parts of water are added together and thoroughly mixed with vigorous agitation. About 1,585 parts of phosgene are then introduced at a temperature of about 25° C. over a period of about 2 hours after which time about 6 parts of triethylamine are then added. The mixture is stirred for an additional hour during which time the pH is adjusted to 14. The reaction mixture is then washed in a separator with about 2% sodium hydroxide solution and thereafter washed with about 2% phosphoric acid and 4 times with water in a separator until neutral, i.e., until a sample of the aqueous phase has a conductivity of not more than $0.1 \times 10^{-4}$ mhos per cm. About 11,500 parts of chlorobenzene are added to the organic phase. It is then distilled until the sump has a temperature of 100° C. and is then left to cool. After a while the viscous solution becomes a gelled mass which is granulated and dried in a vacuum at 130°. About 2,900 parts of a product having a relative viscosity of 1.316 is recovered.

Standard DIN test rods (4×10×120 mm.) are then formed by injection moulding from the dried granulate and placed 90 mm. apart on two rotatable cylinders. A load of 10 kg. is placed at the center and a mixture of m-xylene/n-propanol in the proportion of 35:65 by weight is applied dropwise (temperature 30°). The test rods show no tear formation after 48 hours whereas for example test rods of a polycarbonate made only from bisphenol A break after 100 to 200 seconds under a load of only 5 kg. under these conditions.

EXAMPLE 2

Approximately 2,943 parts of bisphenol A, about 750 parts of the polyurethane of Example 1, about 26.4 parts of p-tertiary butyl phenol, about 1.3 parts of $NaBH_4$, about 34,500 parts of methylene chloride, about 3,460 parts of a 45% sodium hydroxide solution and about 10,000 parts of water are mixed and vigorously agitated. About 1,585 parts of phosgene are then introduced over a period of about 2 hours at a temperature of 25° C. The product is then worked up in accordance with the procedure described in Example 1. A yield of about 2,850 parts of a product having a relative viscosity of 1.30 is obtained.

The test rods of this product are subjected to the test described in Example 1. No tear formation is found after 48 hours at a load of 10 kg.

EXAMPLE 3

Approximately 2,886 parts of bisphenol A, about 1,500 parts of polyurethane from Example 1, about 26.4 parts of p-tertiary butyl phenol, about 1.3 parts of $NaBH_4$, about 34,500 parts of methylene chloride, about 3,460 parts of a 45% sodium hydroxide solution and about 10,000 parts of water are mixed and vigorously stirred. About 1,585 parts of phosgene are then introduced in the course of about 2 hours at a temperature of about 25° C. The resulting product is then worked up in accordance with the procedure described in Example 1. About 2,750 parts of a product having a relative viscosity of 1.301 is recovered.

The test rods of this product show no tear formation after 48 hours under a load of 10 kg. in the test described in Example 1.

EXAMPLE 4

Using the procedure described in Example 1, a polyurethane having a relative viscosity of about 1.028, corresponding to a molecular weight of about 1,900, is produced from about 353 parts of the dichloro-carbonic acid ester of bisphenol A and about 150 parts of N,N'-diisopropyl-hexamethylene diamine. About 2,953 parts of bisphenol A, about 380 parts of this polyurethane, about 26.4 parts of p-tertiary butyl phenol, about 1.3 parts of $NaBH_4$, about 34,500 parts of methylene chloride, about 3,460 parts of a 45% sodium hydroxide solution and about 10,000 parts of water are mixed and vigorously stirred. About 1,585 parts of phosgene are then introduced over a period of about 2 hours at a temperature of about 25° C. The product is then worked up in accordance with the procedure described in Example 1. Approximately 3,010 parts of a product having a relative viscosity of 1.308 is obtained.

The test rods of this product show no tear formation after 48 hours under a load of 10 kg. in the test described in Example 1.

EXAMPLE 5

A polyurethane having a relative viscosity of about 1.071, corresponding to a molecular weight of about 6,000, is produced from about 353 parts of a dichlorocarbonic acid ester of bisphenol A and about 125 parts of N,N'-diisopropyl-hexamethylene diamine by the method described in Example 1.

About 3,000 parts of bisphenol A, about 600 parts of this polyurethane, about 26.4 parts of p-tertiary butyl phenol, about 1.3 parts of NaBH$_4$, about 34,500 parts of methylene chloride, about 3,460 parts of a 45% sodium hydroxide solution and about 10,000 parts of water are mixed and vigorously stirred. About 1,585 parts of phosgene are then introduced for about 2 hours at 25° C. The product is worked up in accordance with the procedure of Example 1. About 3,200 parts of a product having a relative viscosity of 1.312 is recovered.

The test rods of this product show no tear formation after 48 hours under a load of 10 kg. in the test described in Example 1.

EXAMPLE 6

A polyurethane having a relative viscosity of 1.034, corresponding to a molecular weight of about 2,500, is produced from 353 g. of the dichlorocarbonic acid ester of bisphenol A and 210 g. of N,N'-dicyclohexyl-hexamethylene diamine by the method described in Example 1.

3,000 g. of bisphenol A, 250 g. of this polyurethane, 26.4 g. of p-tertiary-butylphenol, 1.3 g. of NaBH$_4$, 34.5 kg. of methylene chloride, 3,460 g. of 45% sodium hydroxide solution and 10 kg. of water are mixed and vigorously stirred. 1,585 g. of phosgene are then introduced in the course of about 2 hours at 25° C. Further working up is carried out as described in Example 1. The product has a relative viscosity of 1.315. Yield 3.1 kg.

EXAMPLE 7

Approximately 353 parts of the dichlorocarbonic acid ester of bisphenol A are dissolved in about 1,500 parts by volume of methylene chloride and cooled to 4° C. About 110 parts of triethylamine are then added dropwise over a period of about 30 minutes, during which time the temperature should not rise above 4° C. A solution containing about 210 parts of N,N'-dicyclohexyl-hexamethylene diamine in about 750 parts by volume of methylene chloride is then added at 4° C. over a period of about 45 minutes. The mixture is then stirred for an additional hour at 4° C. A solution containing about 90 parts of phenol and about 45 parts of caustic soda in about 300 parts of water is then added dropwise with vigorous agitation and the mixture stirred for an additional 3 hours at room temperature. The phases are then separated, the organic phase is washed with water until a sample of the wash water has a conductivity of not more than 0.1×10$^{-4}$ mhos per cm. The remainder of the water is removed azeotropically from the organic phase, the solution is then concentrated by evaporation and the residue dried in vacuo at 100° C. The relative viscosity of the resulting polyurethane which contains phenyl ester end groups is 1.019.

Saponifiable and inorganic chlorine can no longer be detected in the dried product.

A mixture containing about 6,840 parts of bisphenol A, about 6,550 parts of diphenyl carbonate, about 0.016 part of sodium diphenolate and about 260 parts of this polyurethane is then heated to a temperature between about 180 and 250° C. over a period of about 3 hours under nitrogen at 100 mm. Hg in a 25 l. autoclave. About 95% of the phenol is distilled off during this time. The vacuum is then increased to about 0.2 mm. Hg for a period of about 30 minutes. At this pressure and a temperature of about 300° C., a product having a relative viscosity of 1.310 is obtained within about 3 to 4 hours.

The test rods of this product show no tear formation after 48 hours under a load of 10 kg. in the test described in Example 1.

EXAMPLE 8

A mixture containing about 3,000 parts of polycarbonate from bisphenol A having a relative viscosity of about 1.311 and about 130 parts of the polyurethane obtained from Example 7 is stirred for about 2 hours at a temperature of about 270° C. in an atmosphere of nitrogen at normal pressure and then for an additional 2 hours at a vacuum of 0.1 mm. Hg and a temperature of about 300° C. The colorless product has a relative viscosity of about 1.312.

The test rods of this product show no tear formation after 48 hours under a load of 10 kg. in the test described in Example 1.

The end product of all the above examples can be exposed to prolonged heating at a temperature of about 300° C. and even higher without discoloration or decomposition.

The new polymers are suitable for the production of lacquers, moulding compositions, e.g., injection molding and may be formed into films or foils by solution casting or melt casting.

Films and filaments can be prepared by melt, dry or wet spinning procedures. In shaping filaments using solutions, solvents which have been found satisfactory for preparing solutions are methylene chloride, tetrachloroethane, dioxane, chlorobenzene and mixtures of methylene chloride and chlorobenzene.

The modified polycarbonate polymer containing urethane groups are largely insensitive to corrosion following stress cracking.

It is to be understood that the foregoing working examples are given for the purpose of illustration and that any other suitable reactants could be substituted therein if the teachings of the disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

We claim:

1. A process for the production of modified polycarbonates containing polyurethane groups which comprises
    (a) forming a polyurethane composed of recurring structural units of the formula:

(V)

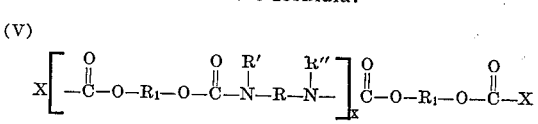

wherein R is a divalent hydrocarbon radical, R' and R" are selected from the group consisting of alkyl, cycloalkyl and aryl radicals having from 1 to 12 carbon atoms, R$_1$ is a divalent radical selected from the group consisting of aliphatic, cyclo-aliphatic and aromatic groups, X is a substituent selected from the group consisting of Cl, Br and

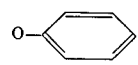

and $x$ is an integer having a value sufficient to give the polyurethane a molecular weight of from about 1500 to about 30,000; and
    (b) incorporating such polyurethane as blocks into high molecular weight polycarbonate chains under splitting off HX wherein the polycarbonate has the formula (IV)
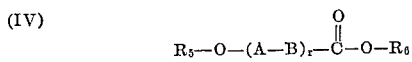

wherein A is a polyurethane block of the formula (I)
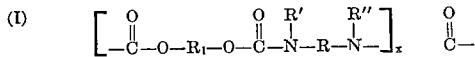

and B is a polycarbonate block of the formula (II)
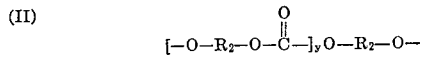

and $R_2$ is a divalent radical selected from the group consisting of aliphatic, cyclo-aliphatic and aromatic groups, $R_5$ and $R_6$ are monovalent radicals selected from the group consisting of unsubstituted and substituted aryl radicals the substituents being selected from the group consisting of halogen atoms, alkyl radicals having from 1 to 12 carbon atoms, cycloalkyl radicals and aryl radicals, $y$ is a variable integer having a value with respect to $x$ such that the ratio of $x:y$ is from about 1:9 to about 1:10,000 and $r$ is a whole number and equal to a molecular weight of from about 3,000 to about 150,000.

2. A process according to claim 1, wherein the polyurethane is obtained from the reaction of a disecondary diamine with a dihalocarbonic acid ester of an organic dihydroxy compound in the presence of a hydrogen halide binding agent.

3. A process according to claim 1, wherein the polyurethane according to Formula V is reacted with a polycarbonate according to the formula:

(VI)
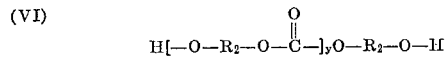

wherein $R_2$ is a divalent radical selected from the group consisting of aliphatic, cycloaliphatic and aromatic groups and $y$ is a variable integer having a value with respect to $x$ such that the ratio of polyurethane to polycarbonate is from about 1:9 to about 1:10,000.

4. A process according to claim 3, wherein X is chlorine or bromine and the polyurethane according to Formula V is reacted with a polycarbonate according to Formula VI in solution under the addition of a hydrogen halide binding agent in the temperature range from the freezing point to the boiling point of the reaction mixture.

5. A process according to claim 3, wherein X is

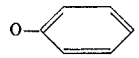

and the polyurethane according to Formula V is reacted with a polycarbonate according to Formula VI in the melt under the addition of a transesterification catalyst in the temperature range from about 150 to about 350° C. under reduced pressure under splitting off of phenol.

6. A process according to claim 1, wherein X is Cl or Br and the polyurethane according to Formula V is reacted with an organic dihydroxy compound and phosgene in solution in the presence of a hydrogen halide binding agent in the temperature range from the freezing point to the boiling point of the reaction mixture.

7. A process according to claim 6, wherein the organic dihydroxy compound is represented by the formula (VII)
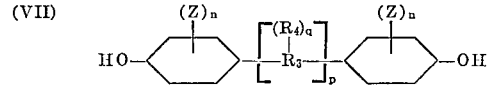

wherein $R_3$ is selected from the group consisting of an alkylene and an alkylidene radical, $R_4$ is a monovalent hydrocarbon radical; Z is a chemical constituent selected from the group consisting of (a) inorganic atoms, (b) alkyl radicals having from 1 to 4 carbon atoms; $n$ is a whole number equal to from 0 to a maximum determined by the number of replaceable nuclear hydrogens substituted on the aromatic hydrocarbon radical; $q$ is a whole number equal to from 0 to a maximum determined by the number of replaceable hydrogens on $R_3$; and $p$ is a whole number equal to from 0 to 1 inclusive.

8. A process according to claim 1, wherein X is

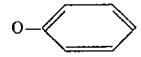

and the polyurethane according to Formula V is reacted with an organic dihydroxy compound and a diester of carbonic acid in the presence of a transesterification catalyst in the temperature range between about 150 and about 350° C.

9. A process according to claim 8, wherein the organic dihydroxy compound is represented by formula VII
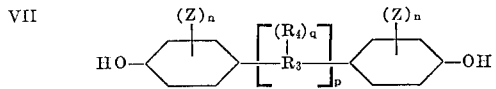

wherein $R_3$ is selected from the group consisting of an alkylene and an alkylidene radical, $R_4$ is a monovalent hydrocarbon radical; Z is a chemical constituent selected from the group consisting of (a) inorganic atoms, (b) alkyl radicals having from 1 to 4 carbon atoms; $n$ is a whole number equal to from 0 to a maximum determined by the number of replaceable nuclear hydrogens substituted on the aromatic hydrocarbon radical; $q$ is a whole number equal to from 0 to a maximum determined by the number of replaceable hydrogens on $R_3$; and $p$ is a whole number equal to from 0 to 1 inclusive.

10. A process according to claim 9, wherein the organic dihydroxy compound is a bis-(hydroxy-arylene)-alkane.

11. The process of claim 10, wherein the bis-(hydroxy-arylene)-alkane is 2,2 - bis - (4-hydroxyphenylene)-propane.

12. A process according to claim 8, wherein the diester of carbonic acid is a diaryl ester.

13. A process according to claim 12, wherein the diaryl ester is diphenyl carbonate.

14. The process of claim 8 wherein the polyurethane is prepared by reacting a disecondary diamine with a dihalocarbonic acid ester of an organic dihydroxy compound in the presence of a hydrogen halide binding agent and the resulting product is reacted with equivalent quantities of a phenol.

15. The process of claim 7 wherein the organic dihydroxy compound is a bis-(hydroxy-arylene)-alkane.

16. The process of claim 15 wherein the bis-(hydroxy-arylene)-alkane is 2,2 - bis-(4-hydroxy-phenylene)-propane.

References Cited

UNITED STATES PATENTS

| | | | |
|---|---|---|---|
| 3,187,065 | 6/1965 | McPherson | 260—47 |
| 3,251,803 | 5/1966 | Caldwell | 260—858 |
| 3,287,442 | 11/1966 | Caldwell | 260—858 |
| 3,320,211 | 5/1967 | Bissinger | 260—858 |

FOREIGN PATENTS 243,198  6/1960  Australia.

SAMUEL H. BLECH, *Primary Examiner.*

PAUL LIEBERMAN, *Assistant Examiner.*

U.S. Cl. X.R.

260—33.2, 33.8, 47, 77.5